United States Patent
Roth et al.

(10) Patent No.: US 7,366,876 B1
(45) Date of Patent: Apr. 29, 2008

(54) EFFICIENT EMULATION INSTRUCTION DISPATCH BASED ON INSTRUCTION WIDTH

(75) Inventors: Charles P. Roth, Austin, TX (US);
Ravi P Singh, Austin, TX (US);
Gregory A. Overkamp, Austin, TX (US); Tien Dinh, Cedar Park, TX (US)

(73) Assignee: Analog Devices, Inc., Norwood, MA (US)

( * ) Notice: Subject to any disclaimer, the term of this patent is extended or adjusted under 35 U.S.C. 154(b) by 568 days.

(21) Appl. No.: 09/704,467

(22) Filed: Oct. 31, 2000

(51) Int. Cl.
*G06F 9/30* (2006.01)
*G06F 9/455* (2006.01)

(52) U.S. Cl. ........................ 712/210; 712/227
(58) Field of Classification Search ............. 712/21, 712/24, 206, 209, 210, 215, 227
See application file for complete search history.

(56) References Cited

U.S. PATENT DOCUMENTS

| | | | |
|---|---|---|---|
| 4,858,105 A | | 8/1989 | Kuriyama et al. |
| 5,249,266 A | * | 9/1993 | Dye et al. .................... 345/501 |
| 5,299,321 A | * | 3/1994 | Iizuka ......................... 712/212 |
| 5,530,804 A | * | 6/1996 | Edgington et al. ............ 714/30 |
| 5,574,927 A | * | 11/1996 | Scantlin ........................ 712/41 |
| 5,774,737 A | * | 6/1998 | Nakano ......................... 712/24 |
| 5,812,562 A | * | 9/1998 | Baeg ............................. 714/726 |
| 5,848,288 A | * | 12/1998 | O'Connor ...................... 712/24 |
| 5,887,001 A | * | 3/1999 | Russell ......................... 714/726 |
| 5,941,980 A | | 8/1999 | Shang et al. |
| 5,970,241 A | * | 10/1999 | Deao et al. .................. 712/227 |
| 6,016,543 A | | 1/2000 | Suzuki et al. |
| 6,065,108 A | | 5/2000 | Tremblay et al. |
| 6,070,252 A | * | 5/2000 | Xu et al. ....................... 714/30 |
| 6,112,298 A | | 8/2000 | Deao et al. |
| 6,170,051 B1 | * | 1/2001 | Dowling ..................... 712/225 |
| 6,404,684 B2 | * | 6/2002 | Arimoto et al. ............ 365/201 |
| 6,665,817 B1 | * | 12/2003 | Rieken ......................... 714/30 |

FOREIGN PATENT DOCUMENTS

| | | |
|---|---|---|
| EP | 0 417 013 | 3/1991 |
| JP | 07-084781 | 3/1995 |
| JP | H10-187491 | 7/1998 |
| JP | 10-222391 | 8/1998 |
| JP | H10-320197 | 12/1998 |
| JP | H11-327902 | 11/1999 |

OTHER PUBLICATIONS

Instant Web's Free On-line Computing Dictionary. © 1998. http://www.instantweb.com/foldoc/foldoc.cgi?computer+dictionary Search Term: State Machine.*
Machine translation of Japanese Publication No. 07-084781 from the Japanese Patent Office (7 pages).
Machine translation of Japanese Publication No. 10-222391 from the Japanese Patent Office ( 10 pages).

* cited by examiner

*Primary Examiner*—Aimee J. Li
(74) *Attorney, Agent, or Firm*—Fish & Richardson P.C.

(57) ABSTRACT

In one embodiment, a state machine receives a plurality of instructions from an instruction register to be processed by a digital signal processor. After receiving a single RTI, the state machine loads each of the plurality of instructions one at time and determines the validity of each instruction. If the instruction is valid, the state machine transfers the instruction to the decoder. If the instruction is invalid or if a no-operation instruction is present, the state machine discards the instruction and immediately loads the next instruction.

23 Claims, 5 Drawing Sheets

EFFICIENT EMULATION INSTRUCTION DISPATCH BASED ON INSTRUCTION WIDTH

TECHNICAL FIELD

This invention relates to digital signal processors, and more particularly to controlling multiple instructions received from the emulation instruction register.

BACKGROUND

Digital signal processing is concerned with the representation of signals in digital form and the transformation or processing of such signal representation using numerical computation. Digital signal processing is a core technology for so many of today's high technology products in fields such as wireless communications, networking, and multimedia. One reason for the prevalence of digital signal processing technology has been the development of low cost, powerful digital signal processors (DSPs) that provide engineers the reliable computing capability to implement these products cheaply and efficiently. Since the development of the first DSPs, DSP architecture and design have evolved to the point where even sophisticated real-time processing of video-rate sequences can be performed.

DSPs are often used for a variety of multimedia applications such as digital video, imaging, and audio. DSPs can manipulate the digital signals to create and open such multimedia files.

MPEG-1 (Motion Picture Expert Group), MPEG-2, MPEG-4 and H.263 are digital video compression standards and file formats. These standards achieve a high compression rate of the digital video signals by storing mostly changes from one video frame to another, instead of storing each entire frame. The video information may then be further compressed using a number of different techniques.

The DSP may be used to perform various operations on the video information during compression. These operations may include motion search and spatial interpolation algorithms. The primary intention is to measure distortion between blocks within adjacent frames. These operations are computationally intensive and may require high data throughput.

The MPEG family of standards is evolving to keep pace with the increasing bandwidth requirements of multimedia applications and files. Each new version of the standard presents more sophisticated algorithms that place even greater processing requirements on the DSPs used in MPEG compliant video processing equipment.

Video processing equipment manufacturers often rely on application-specific integrated circuits (ASICs) customized for video encoding under the MPEG and H.263 standards. However, ASICs are complex to design, costly to produce and less flexible in their application than general-purpose DSPs.

DESCRIPTION OF DRAWINGS

These and other features and advantages of the invention will become more apparent upon reading the following detailed description and upon reference to the accompanying drawings.

DETAILED DESCRIPTION

Figure 1:
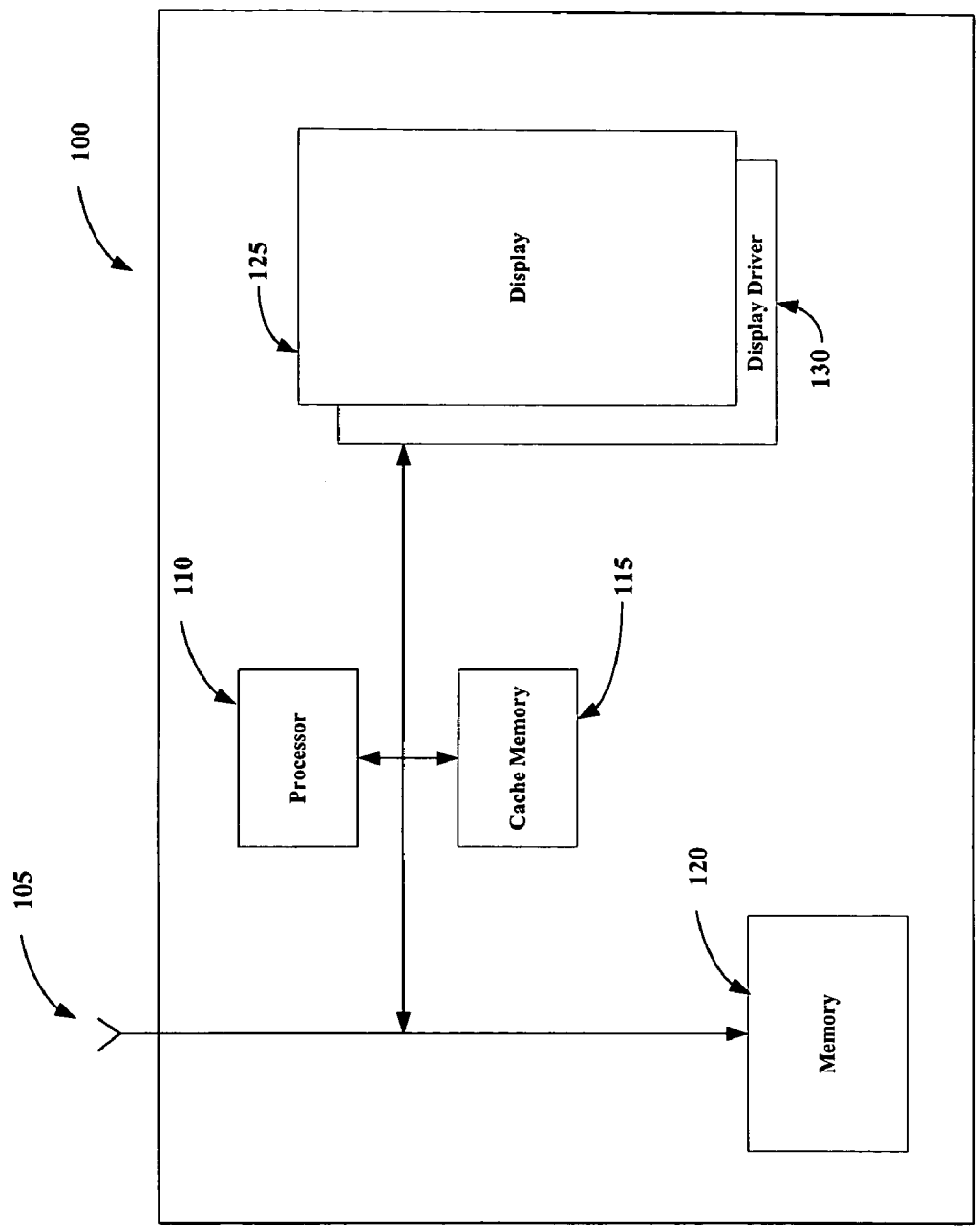
FIG. 1 is a block diagram of a mobile video device utilizing a processor according to one embodiment of the present invention.

FIG. 1 illustrates a mobile video device 100 including a processor according to an embodiment of the invention. The mobile video device 100 may be a hand-held device which displays video images produced from an encoded video signal received from an antenna 105 or a digital video storage medium 120, e.g., a digital video disc (DVD) or a memory card. A processor 110 may communicate with a cache memory 115 which may store instructions and data for the processor operations. The processor 110 may be a microprocessor, a digital signal processor (DSP), a microprocessor controlling a slave DSP, or a processor with an hybrid microprocessor/DSP architecture. For the purposes of this application, the processor 110 will be referred to hereinafter as a DSP 110.

The DSP 110 may perform various operations on the encoded video signal, including, for example, analog-to-digital conversion, demodulation, filtering, data recovery, and decoding. The DSP 110 may decode the compressed digital video signal according to one of various digital video compression standards such as the MPEG-family of standards and the H.263 standard. The decoded video signal may then be input to a display driver 130 to produce the video image on a display 125.

Hand-held devices generally have limited power supplies. Also, video decoding operations are computationally intensive. Accordingly, a processor for use in such a device is advantageously a relatively high speed, low power device.

The DSP 110 may have a deeply pipelined, load/store architecture. By employing pipelining, the performance of the DSP may be enhanced relative to a non-pipelined DSP. Instead of fetching a first instruction, executing the first instruction, and then fetching a second instruction, a pipelined DSP 110 fetches the second instruction concurrently with execution of the first instruction, thereby improving instruction throughput. Further, the clock cycle of a pipelined DSP may be shorter than that of a non-pipelined DSP, in which the instructions are fetched and executed in the same clock cycle.

Such a DSP 110 may be used in video camcorders, teleconferencing, PC video cards, and High-Definition Television (HDTV). In addition, the DSP 110 may also be used in connection with other technologies utilizing digital signal processing such as voice processing used in mobile telephony, speech recognition, and other applications.

Figure 2:
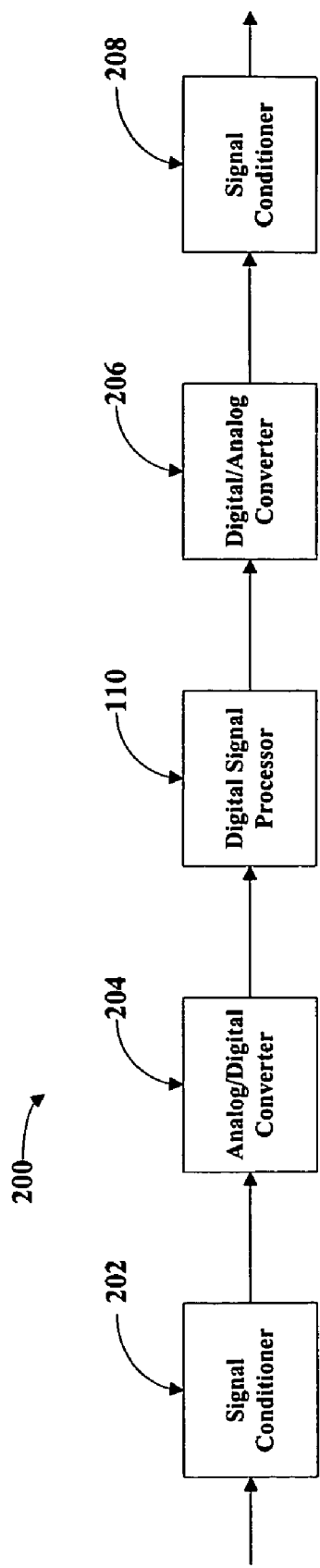
FIG. 2 is a block diagram of a signal processing system according to an embodiment of the present invention.

Turning now to FIG. 2, a block diagram of a signal processing system 200 including DSP 110 according to an embodiment is shown. One or more analog signals may be provided by an external source, e.g., antenna 105, to a signal conditioner 202. Signal conditioner 202 is configured to perform certain preprocessing functions upon the analog signals. Exemplary preprocessing functions may include mixing several of the analog signals together, filtering, amplifying, etc. An analog-to-digital converter (ADC) 204 is coupled to receive the preprocessed analog signals from signal conditioner 202 and to convert the preprocessed analog signals to digital signals consisting of samples, as described above. The samples are taken according to a sampling rate determined by the nature of the analog signals received by signal conditioner 202. The DSP 110 is coupled to receive digital signals at the output of the ADC 204. The DSP 110 performs the desired signal transformation upon the received digital signals, producing one or more output digital signals. A digital-to-analog converter (DAC) 206 is coupled to receive the output digital signals from the DSP 110. The DAC 206 converts the output digital signals into output analog signals. The output analog signals are then conveyed to another signal conditioner 208. The signal conditioner 208 performs post-processing functions upon the output analog signals. Exemplary post-processing functions are similar to the preprocessing functions listed above. It is noted that various embodiments of the signal conditioners 202 and 208, the ADC 204, and the DAC 206 are well known. Any suitable embodiment of these devices may be coupled into a signal processing system 200 with the DSP 110.

Figure 3:
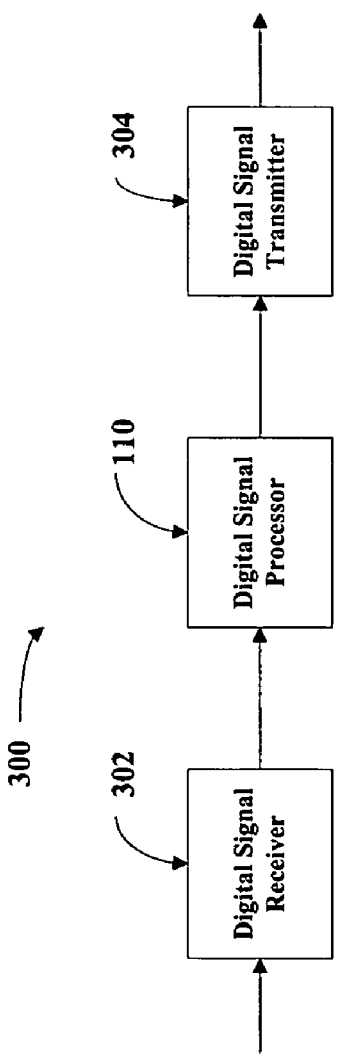
FIG. 3 is a block diagram of an alternative signal processing system according to an embodiment of the present invention.

Turning next to FIG. 3, a signal processing system 300 according to another embodiment is shown. In this embodiment, a digital receiver 302 may receive one or more digital signals and to convey the received digital signals to the DSP 110. As with the embodiment shown in FIG. 2, DSP 110 performs the desired signal transformation upon the received digital signals to produce one or more output digital signals. Coupled to receive the output digital signals is a digital signal transmitter 304. In one exemplary application, the signal processing system 300 is a digital audio device in which the digital receiver 302 conveys to the DSP 110 digital signals indicative of data stored on the digital storage device 120. The DSP 110 then processes the digital signals and conveys the resulting output digital signals to the digital transmitter 304. The digital transmitter 304 then causes values of the output digital signals to be transmitted to the display driver 130 to produce a video image on the display 125.

Figure 4:
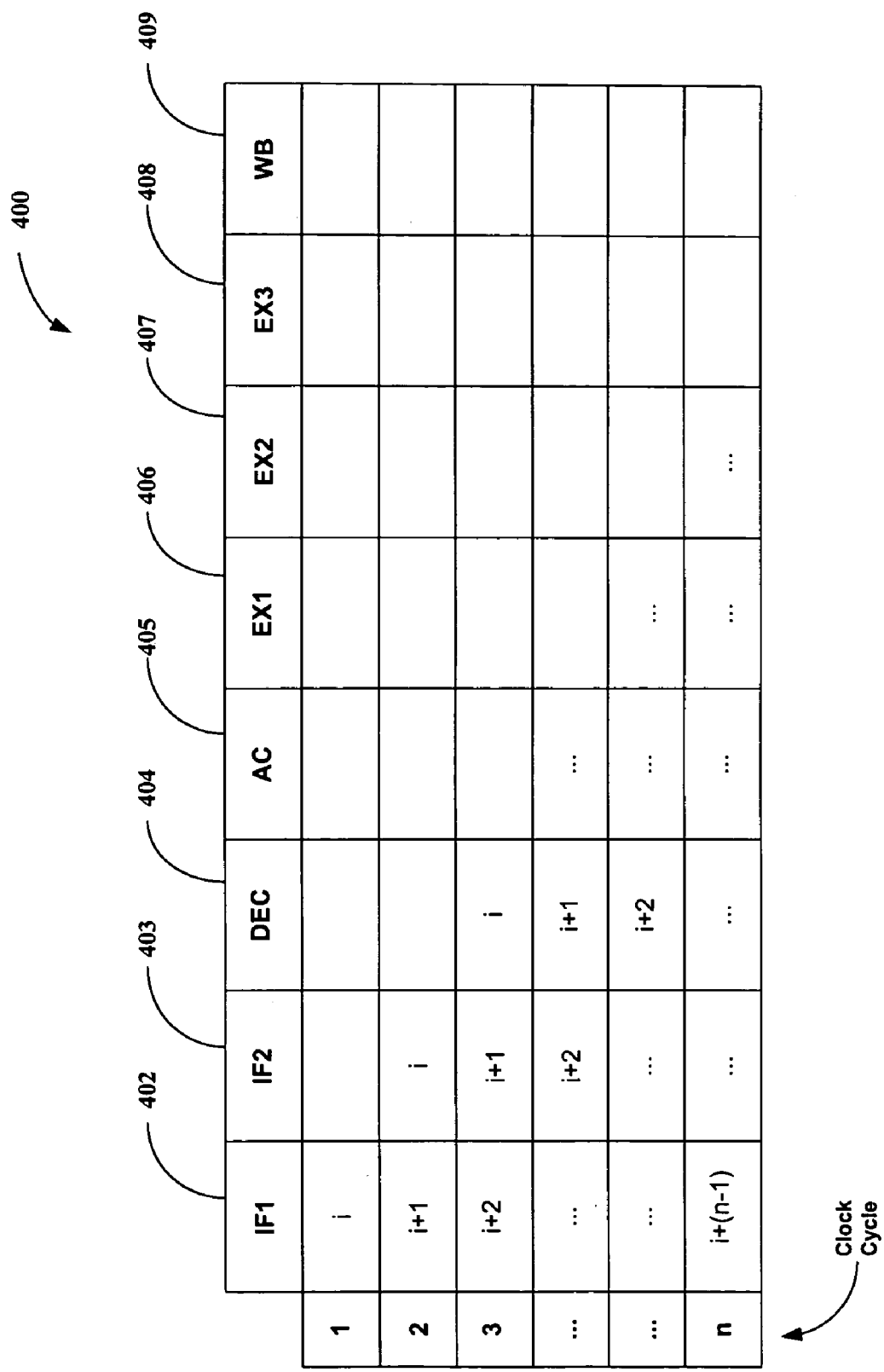
FIG. 4 illustrates exemplary pipeline stages of the processor in FIG. 1 according to an embodiment of the present invention.

The pipeline 400 illustrated in FIG. 4 includes eight stages, which may include instruction fetch 402-403, decode 404, address calculation 405, execution 406-408, and write-back 409 stages. An instruction i may be fetched in one clock cycle and then operated on and executed in the pipeline 400 in subsequent clock cycles concurrently with the fetching of new instructions, e.g., i+1 and i+2.

Pipelining may introduce additional coordination problems and hazards to processor performance. Jumps in the program flow may create empty slots, or "bubbles," in the pipeline. Situations which cause a conditional branch to be taken or an exception or interrupt to be generated may alter the sequential flow of instructions. After such an occurrence, a new instruction may be fetched outside of the sequential program flow, making the remaining instructions in the pipeline irrelevant. Methods such as data forwarding, branch prediction, and associating valid bits with instruction addresses in the pipeline may be employed to deal with these complexities.

Figure 5:
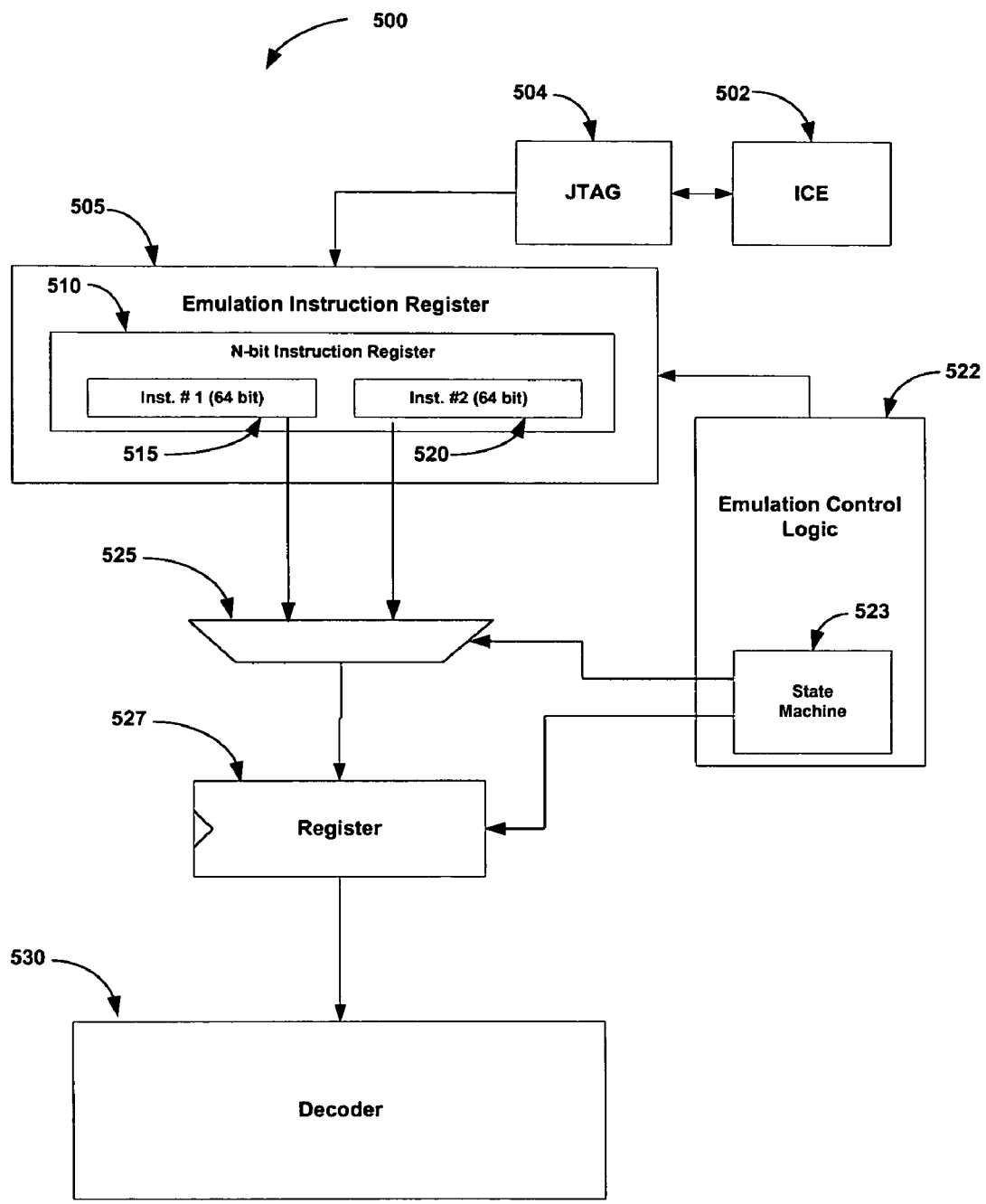
FIG. 5 is a block diagram of a emulation system according to one embodiment of the present invention.

FIG. 5 is a block diagram illustrating an emulation system 500 according to one embodiment of the present invention. The emulation system 500 includes the connection of an in-circuit-emulator (ICE) 502 to the DSP 110 through a JTAG (Joint Test Action Group) interface 504. In-circuit-emulation is a system which includes a peripheral device referred to as an in-circuit-emulator (ICE) 502 that is external to a target processor system which monitors the target processor's operations and can generate real-time trace information for reconstructing processor execution in an external host emulator. The ICE 502 may control the processor and monitor and modify the state of the registers within the processor. An ICE 502 may include its own ICE bus, separate from normal data, address or control busses found on the processor integrated circuit, so as not to interfere with processor behavior while the ICE 502 generates trace information.

Emulation may be performed during procedures such as debugging, hardware development, or software development using a JTAG interface 504 as defined by the standard specified by IEEE 1149.1. Instructions that are to be executed during emulation may be scanned in from the ICE 502 to the emulation instruction register (EMUIR) 505 using the JTAG interface 504. The instructions may be scanned serially from the ICE 502 to the JTAG interface 504 through a shift register (not shown). After the shift register is loaded from the ICE 502, the JTAG interface 504 loads either of the instruction registers 515, 520 in the EMUIR 505 in parallel. For example, a first 64-bit instruction may be loaded from the ICE 502 to the first instruction register 515 and a second 64-bit instruction may be loaded from the ICE 502 to the second instruction register 520. Of course, each of the 64-bit instructions may include a single instruction, or a plurality of instructions. For example, the 64-bit instructions may include a 32-bit instruction and 2 parallel 16-bit instructions.

The first 64-bit instruction may be loaded serially into the first instruction register 515 through the JTAG interface 504 in 64 clock cycles and the second 64-bit instruction may be loaded serially into the second instruction register 520 through the JTAG interface 504 in an additional 64 clock cycles. The first instruction and/or the second instruction may remain in the first instruction register 515 and/or the second instruction register 520 so they may be re-executed if necessary.

After the instructions are loaded into the instruction registers 515, 520, the JTAG system may enter a run-test idle (RTI) state indicating that the instructions may be issued to the pipeline. After entering the RTI state, the first instruction may be issued to the pipeline. When the first instruction reaches the write-back stage, the second instruction may be issued to the pipeline. After the second instruction reaches write-back, the JTAG interface 504 waits for the next instruction. If the ICE 502 wants to repeat the first instruction and/or the second instruction, the instructions do not need to be reloaded into the instruction registers 515, 520. When the first or second instructions are repeated, the clock cycles necessary to load the instructions into the instruction registers 515, 520 through the JTAG interface 504 are saved.

The RTI state allows certain operations to occur depending on the current instruction. Entering the RTI state consumes a clock cycle, and thus, slows down the emulation of the DSP 110. By allowing the emulation instruction register 505 to provide multiple instructions, the DSP 110 may not need an RTI after every instruction is executed, thus saving time.

The emulation system 500 according to one embodiment of the present invention also includes emulation control logic 522, a state machine 523, a multiplexer 525, a register 527, and a decoder 530. The emulation control logic 522 includes the state machine 523 and provides control signals to the instruction registers 515, 520, the multiplexers 525, and the register 527. The control signals from the emulation control logic control the updates and reading of the EMUIR

505. In one embodiment, the emulation instruction register is a 128-bit instruction register 510, which includes a plurality of smaller instruction registers such as the 64-bit first and second instruction registers 515, 520. Typically, the instruction registers 515, 520 may supply one instruction at a time, with the instruction being up to 64-bits in length. However, according to one embodiment of the present invention, multiple instructions may be supplied simultaneously from the 64-bit instruction registers 515, 520. As shown in FIG. 5, the first instruction 515 and the second instruction 520 may be loaded in the 64-bit instruction register. Of course, the size of the first instruction 515 and the second instruction 520 must not exceed 64-bits. Thus, the first instruction 515 may be a 32-bit instruction and the second instruction 520 may be a 32-bit instruction. The first and second instructions 515, 520 may also be 16-bit or other size, provided the size of the instructions fit into each of the 64-bit instruction registers 515, 520.

The emulation instruction register 505 provides the contents of the instruction registers 515, 520 to the multiplexer 525. Because the instruction registers 515, 520 may contain a plurality of instructions, the emulation control logic 522 may control the flow of the instructions received from the emulation instruction register 505. The emulation control logic 522 includes logic described below to supply the instructions to the decoder 530. The state machine 523 may determine whether the instructions are valid. The state machine 523 may then provide these instructions to the decoder 530 via the register 527. This may provide the instructions to the decoder 530 while reducing the disruption to the decoder 530.

The present invention is described using two 64-bit instruction registers providing two instructions of 64-bits or smaller. Of course, the invention may be accomplished on any size instruction register (N-bit) providing multiple instructions.

Figure 6:
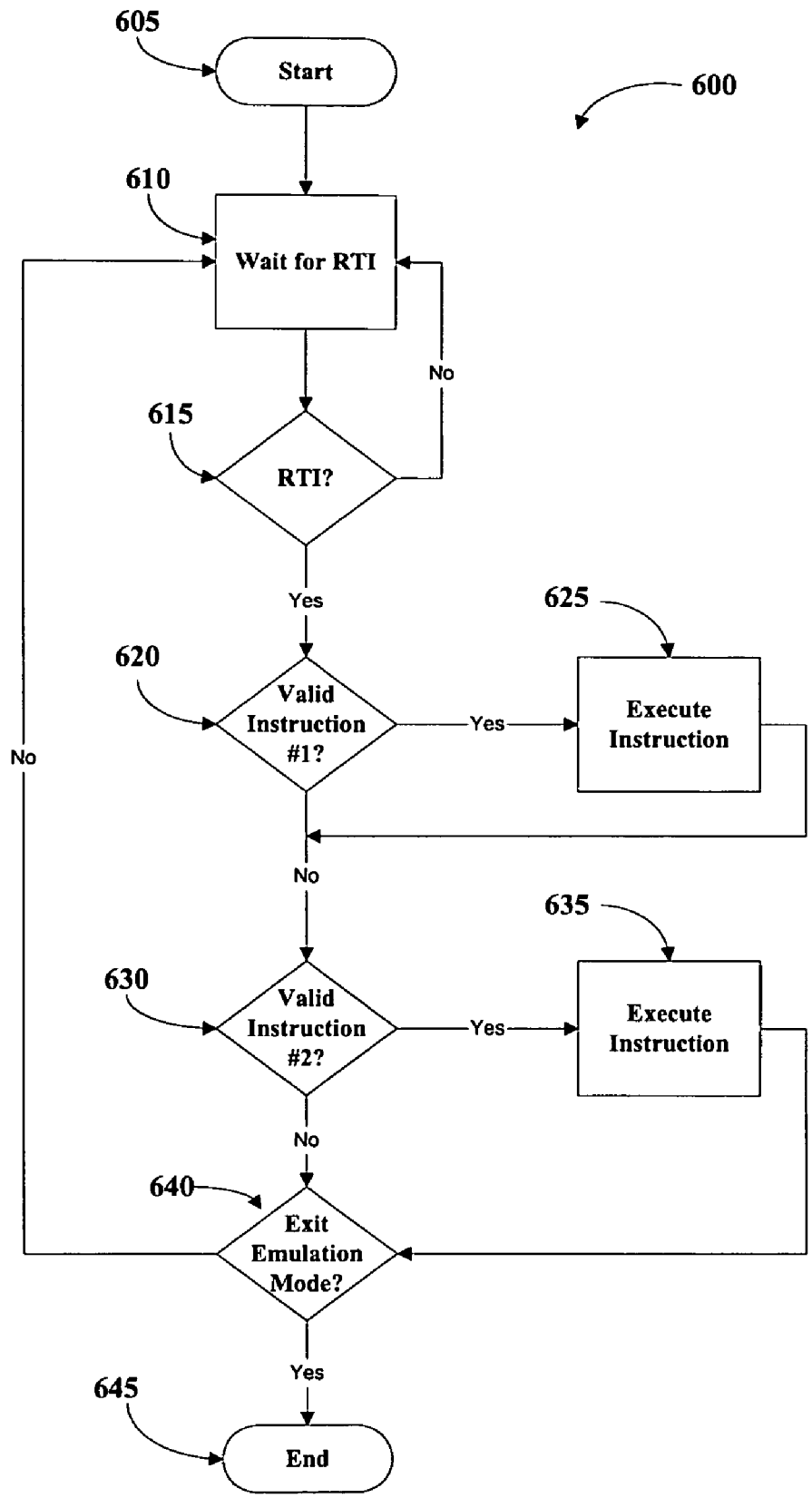
FIG. 6 illustrates the process of receiving and executing multiple instructions from the emulation instruction register according to one embodiment of the present invention.

The process 600 for processing instructions by the emulation control logic 522 is shown in FIG. 6. The process 600 begins at a start block 605. Proceeding to block 610, the process 600 waits for an RTI to begin the flow of instructions. The RTI may come from the JTAG interface 504. Proceeding to block 615, the process determines whether an RTI is detected. If no RTI is detected, the process 600 proceeds along the NO branch back to block 610 to wait for the RTI. The process 600 remains in this loop until an RTI is detected.

Returning to block 615, once an RTI is detected, the process proceeds along the YES branch to block 620. In block 620, the validity of the first instruction is determined. An instruction may include a corresponding set of width bits defining the validity and size of the instruction. In one embodiment of the invention, the width bits are a 2-bit signal. With a 2-bit signal, there are 4 possible values for the 2-bit width signal. For example, width bits of 00 indicates the instruction is invalid, width bits of 01 indicates a 16-bit instruction, width bits of 10 indicates a 32-bit instruction, and width bits of 11 indicates a 64-bit instruction. By reading the width bits, the DSP 110 may determine both the validity and size of the instruction.

If the instruction is valid, the process 600 proceeds along the YES branch to block 625. In block 625, the first instruction flows down the pipeline for execution. Following execution of the first instruction, the process 600 proceeds to block 630. Returning to block 620, if the instruction is invalid, the process 600 proceeds along the NO branch to block 630.

In block 630, the second instruction is received by the DSP 110. Because the first and second instructions are stored in the emulation instruction register at the same time, the second instruction may be retrieved without having to enter another RTI state.

Proceeding to block 630, the validity of the second instruction is determined. The validity of the second instruction may also be determined by examination of the width bits as described above. If the instruction is valid, the process 600 proceeds along the YES branch to block 635. In block 635, the second instruction flows down the pipeline for execution. Following execution of the second instruction, the process 600 proceeds to block 640. Returning to block 630, if the instruction is invalid, the process 600 proceeds along the NO branch to block 640.

In block 640, the process 600 determines whether the DSP 110 should exit the emulation mode. The determination to exit the emulation mode may be provided by the emulation control logic 522. If further emulation is indicated, the process proceeds along the NO branch back to block 610 to wait for the next RTI. Returning to block 640, if the emulation control logic 522 provides instructions to exit the emulation mode, the process 600 proceeds along the YES branch to an end block 645.

Numerous variations and modifications of the invention will become readily apparent to those skilled in the art. Accordingly, the invention may be embodied in other specific forms without departing from its spirit or essential characteristics.

What is claimed is:

1. A method comprising:
   i. Receiving a plurality of instructions from a test interface;
   ii. Loading the plurality of instructions into an emulation instruction register;
   iii. Receiving the plurality of instructions from the emulation instruction register;
   iv. Determining a validity of a first instruction of the plurality of instructions by reading width bits in the first instruction, the width bits which are read defining the validity and size of the first instruction;
   v. Providing the first instruction to a decoder of a processor if the first instruction is valid;
   vi. Without receiving a run-test idle state signal, determining a validity of a second instruction of the plurality of instructions by reading width bits in the second instruction, the width bits which are read defining the validity and size of the second instruction; and
   vii. Providing the second instruction to the decoder if the second instruction is valid.

2. The method of claim 1, further comprising storing the plurality of instructions in the emulation instruction register in subsequent clock cycles.

3. The method of claim 1, further comprising loading the plurality of instructions in parallel into the emulation instruction register.

4. The method of claim 1, further comprising providing the second instruction to the decoder after the first instruction is completed.

5. The method of claim 1, further comprising providing the plurality of instructions to the decoder after a first run-test idle state without entering into a second run-test idle state.

6. The method of claim 1, further comprising providing the first and second instructions to a digital signal processor.

7. The method of claim 1, further comprising:

scanning instructions from an in-circuit emulator (ICE) to the test interface, the test interface comprising a Joint Test Action Group (JTAG) interface.

8. The method of claim 1, wherein a pre-determined set of width bits indicates an instruction is invalid.

9. The method of claim 1, further comprising executing at least one of the plurality of instructions to monitor operation of the processor.

10. The method of claim 1, further comprising:
performing a debugging operation using the first and second instructions.

11. A method of providing instructions to a processor, the method comprising:
loading a plurality of instructions into an emulation instruction register from a test interface;
receiving a run-test idle state signal, the run-test idle state signal indicating entry of the test interface into a run-test idle state;
providing the plurality of instructions to the processor in response to the receipt of the run-test idle state signal;
determining a validity of each of the plurality of instructions before processing by reading bits in each instruction indicating a width of the instruction; and
processing the plurality of instructions without receiving another run-test idle state signal.

12. The method of claim 11, further comprising aborting processing of any invalid instructions and loading a next instruction into the emulation instruction register.

13. The method of claim 11, further comprising loading a next instruction into the emulation instruction register if a no-operation instruction is loaded.

14. The method of claim 9, further comprising providing the plurality of instructions to the processor a plurality of times without reloading the instruction register.

15. The method of claim 11, wherein the processor is a digital signal processor.

16. A processor comprising:
i. A test interface;
ii. An emulation instruction register adapted to store a plurality of emulation instructions received from the test interface;
iii. Emulation control logic adapted to supply the plurality of emulation instructions to a processor pipeline in response to detection of an entry of the test interface into a run-test idle state, wherein the emulation control logic determines a validity of the plurality of emulation instructions by reading bits in each instruction indicating a width of each instruction and discards any invalid instructions; and
iv. A decoder to receive the plurality of emulation instructions for processing.

17. The processor of claim 16, wherein the emulation control logic loads a next instruction from the emulation instruction register immediately after detecting a no-operation instruction.

18. The processor of claim 16, wherein the processor is a digital signal processor.

19. The processor of claim 16, wherein the emulation instruction register comprises first and second registers.

20. The processor of claim 16, wherein the emulation control logic comprises a state machine.

21. The processor of claim 16, further comprises a multiplexer to select an instruction from the plurality of emulation instructions to send to the processor pipeline.

22. An apparatus, including operating instructions residing on a machine-readable storage medium, for use in a device to handle a plurality of emulation instructions, the operating instructions causing the device to:
i. Load the plurality of emulation instructions into a single emulation instruction register;
ii. Have a test interface enter a run-test idle state;
iii. Provide the plurality of emulation instructions to a processor in response to entry of the test interface into the run-test idle state; and
iv. Process the plurality of emulation instructions,
v. Wherein a validity of each of the plurality of emulation instructions is determined before processing by reading bits in each instruction indicating a width of each emulation instruction.

23. The apparatus of claim 22, further comprising an in-circuit emulator to monitor operations of the processor.

* * * * *